United States Patent
Rigney et al.

[11] Patent Number: 5,974,954
[45] Date of Patent: Nov. 2, 1999

[54] BARBECUE GRILL GRATE

[75] Inventors: Donald P. Rigney; Lloyd Maschhoff, both of Belleville, Ill.

[73] Assignee: Empire Comfort Systems, Inc., Belleville, Ill.

[21] Appl. No.: 09/139,237

[22] Filed: Aug. 25, 1998

[51] Int. Cl.[6] .............................. A47J 37/07; A47J 27/00
[52] U.S. Cl. ................................ 99/396; 99/445; 99/446; 99/450
[58] Field of Search .............................. 99/396, 425, 445, 99/446, 450; 126/25 R, 39 M

[56] References Cited

U.S. PATENT DOCUMENTS

| | | | |
|---|---|---|---|
| D. 340,835 | 11/1993 | Lupa et al. | D7/409 |
| 1,956,387 | 4/1934 | Hartman | 99/446 |
| 2,459,657 | 1/1949 | Klein . | |
| 3,199,438 | 8/1965 | Myler et al. . | |
| 3,369,481 | 2/1968 | Pappas . | |
| 3,623,422 | 11/1971 | Marshall . | |
| 3,842,726 | 10/1974 | Fautz | 99/425 |
| 4,034,662 | 7/1977 | McLane | 99/445 |
| 4,428,281 | 1/1984 | Miller | 99/445 |
| 4,606,261 | 8/1986 | Bernardi | 99/445 |
| 4,784,109 | 11/1988 | Korpan | 126/25 R |
| 4,979,440 | 12/1990 | Latour et al. | 99/445 |
| 5,009,151 | 4/1991 | Hungerford | 99/445 |
| 5,105,725 | 4/1992 | Haglund | 99/446 |
| 5,347,978 | 9/1994 | Zuran | 99/445 X |
| 5,437,221 | 8/1995 | Schwod | 99/445 X |
| 5,467,691 | 11/1995 | Koziol | 99/340 |

FOREIGN PATENT DOCUMENTS 1139489   7/1957   France .

*Primary Examiner*—Reginald L. Alexander
*Attorney, Agent, or Firm*—Howell & Haferkamp, L.C.

[57] ABSTRACT

A cooking grate for a grill, such as a barbecue grill, is comprised of a plurality of generally elongate rail members assembled in a nesting relationship to form a first and second cooking surface. The first cooking surface is formed by a generally flat surface on each of the rail members, the flat surfaces abutting to form a substantially smooth surface, with a plurality of elongate apertures therein through which juices produced by cooking food may flow. Each rail member has a gutter along its length which underlies approximately half of each of the apertures for catching a portion of the juices and diverting it from the heat source below. The grate may be reversed and the gutters form the second cooking surface which is similar to a conventional grate surface.

12 Claims, 4 Drawing Sheets

BARBECUE GRILL GRATE

BACKGROUND OF THE INVENTION

This invention relates to cooking surfaces for barbecue grills in general, and specifically to a reversible barbecue grill grate that collects cooking fluid and directs it away from the heat source of a grill.

Barbecue grills have become popular for many reasons, but principal among them is that food prepared on them acquires a distinctive flavor unobtainable by other means. This "barbecue flavor" is partly the result of gases and smoke emanating from the heat source of the grill itself, but mostly is the result of smoke and vapors caused by cooking liquids, such as barbecue sauce or other popular sauces, and meat juices falling into the heat source of the grill. It is the smoke and vapor caused by these liquids and juices burning that principally cause and enhance the barbecue flavor.

The burning of these liquids in the heat source of a grill, however, is often problematic. Food juices and cooking liquids often produce "flare-ups" or intense flames as they are ignited by the heat source. These flare-ups negatively affect the barbecue grilling experience in several ways. First, the increased heat from the flare-ups makes it difficult to evenly cook the food on the grill, and often results in charring of the food on the outside while the inside is not fully cooked. This difficulty is heightened when the barbecuer engages in firefighting as well as cooking. Second, the increased heat from the flare-up often produces more food juices, which, in turn, increases the intensity of the flare-up. This can and often does result in an uncomfortable and dangerous situation to the barbecuer and to those around the grill. Third and finally, flareups considerably increase the amount of work required in barbecuing, as the increased and uneven heat of the flare-ups necessitates greater handling of the food on the grill to avoid severely burning it. The increased workload combined with the increased heat generated from flare-ups substantially detracts from the barbecue experience.

Furthermore, frequent flare-ups may reduce the lifespan of the grill. The excess heat and residue from the flare-ups may accelerate the decomposition of the burners and the corrosion of the shell housing. The excess heat of flare-ups may also compromise the lifespan of accessories such as grill rotisseries located over the grill grates and shelves located along the sides of the grill.

The barbecue grill cooking racks and grill plates of the prior art are ill-equipped to counter the problem of flare-ups, and often contribute to them, because they provide unregulated access of cooking juices and liquids to the heat source of the grill. Still other grates in the prior art are of one piece construction, such as molded or cast aluminum or steel, which makes them suitable for indirect heating but which also makes them relatively expensive. Furthermore, if these grates become damaged, rusted, or break they are not economically repairable. Instead, a complete new grate must be obtained, at not insubstantial expense.

SUMMARY OF THE INVENTION

Among the several advantages of the present invention may be noted the provision of a reversible barbecue grill grate that avoids flare-ups on one side of the grate by regulating the amount of cooking fluid and juices that passes therethrough onto the heat source; the provision of a reversible barbecue grill grate that functions as a conventional grate on, the opposite side of the grate; the provision of a barbecue grill grate that enhances cooking with indirect heat; and the provision of a grill grate that is less expensive than a cast metal grate, is repairable, and has an improved useable lifespan.

Generally the present invention comprises a plurality of elongated and nesting stainless steel grate or rail members secured to one another. Each member has offset substantially parallel surfaces in spaced relation from one another at either end of a vertical rib. The offset surfaces of a plurality of adjacent grate members form opposite first and second cooking surfaces.

The first cooking surface is generally flat and continuous, and has a plurality of staggered elongated apertures for cooking liquids and juices to flow through. The second cooking surface comprises a plurality of spaced, longitudinal flat surfaces with each flat surface having a ramped or sloped portion positioned so that the edges of the ramped or sloped portions underlie and substantially longitudinally bisect the apertures of the first cooking surface. Thus, the longitudinal flat surfaces and their ramped or sloped portions form gutters to catch a portion of the fluid flowing downwardly through the apertures of the first surface.

The grill grate is mounted to the grill housing at a slope relative to the grill housing, so that when the first cooking surface of the grate is used, cooking liquid or juice flows across the surface of the grate and into the apertures. Because the gutters underlie approximately one half of the area of the apertures, a portion of the juice flowing through the apertures is collected by the gutters. Because the grate is mounted at an angle, the liquid collected into the gutters flows down then to the back of the grill and away from the heat source. Liquid or juices passing through the apertures of the first surface beyond the reach of the gutters fall into the heat source of the grill so that the barbecue flavor is generated. Thus, the barbecue flavor is obtained, and undesirable flare-ups are avoided by limiting the amount of liquid falling into the grill.

When the second side of the cooking grate is used, the flat surfaces of the second side simulate the spaced bars of a conventional barbecue rack. The cooking juices and liquids flow through the apertures and into the heat source to generate the barbecue flavor. The impact of flare-ups is reduced as a portion of the juices don't flow into the apertures and instead flow to the back of the grill.

Finally, because the grate members are made of stainless steel and provide a greater "heat sink" effect than a conventional cooking grill, the grate enhances the indirect cooking of food on the grill. When used in this manner, flare-ups may be virtually entirely avoided. The grate also conveniently provides for warming food or keeping it warm, as well as simultaneously cooking food at different rates.

Other objects and features of the invention will be in part apparent and in part pointed out hereinafter.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
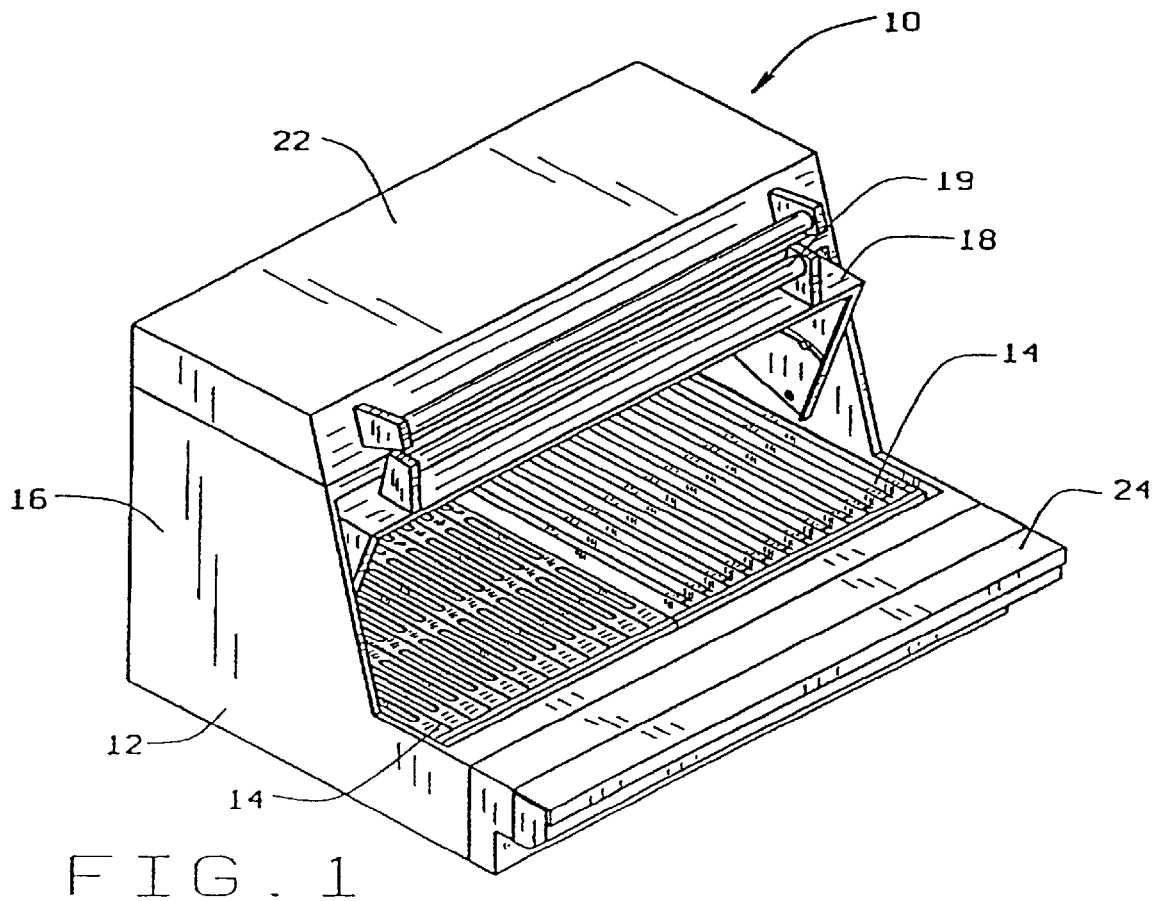
FIG. 1 is a perspective view of a barbecue grill having grill grates of the present invention.

Referring now to the drawings, a portion of a barbecue grill incorporating the present invention is indicated generally by the reference numeral 10 in FIG. 1. For illustrative purposes, the invention will be described in the context of an outdoor barbecue grill. It is to be understood, however, that the invention is equally well suited for grills intended to be used indoors, as are becoming increasingly more common.

The barbecue grill of the present invention has a lower housing 12 configured for cooking and heating food. The grill housing is attached to a stand (not shown) to position the grill at an acceptable level for the cooking of food. As is well understood in the art, the structure of grill stands varies considerably depending on many factors not important here.

The lower housing 12, or the grill pit, may be configured with a burner for gas heating, an electric element for electric heating, or the lower housing of the grill may be configured for heating by a charcoal fire or other heat sources well known in the art that are susceptible to flare-ups. In the case of gas or electric grills, burner controls (not shown) are often mounted on the lower grill housing 12. Optionally, an igniter may also be incorporated. While the lower portion 12 shown in the figures herein is relatively shallow in depth, it is to be understood that it may be of any convenient size in order to accommodate the heat generating and retaining components found in conventional grills.

The lower housing 12 of the grill includes two reversible cooking grates 14 according to the present invention and later described. One of the grates 14, is oriented to function as a conventional grill rack, while the other grate 14 is reversed to prevent flare-ups as will be explained below. The grates 14, are located over the heat generating and maintaining components of the grill. While two cooking grates are illustrated in the grill of FIG. 1, one or more grates could be utilized to practice the invention. Also, the grill grate of the present invention could be used in combination with other grill grates or racks known in the art.

The grill 10 also has an upper housing 16 which includes a lid 18 with a handle 19 that allows access to the cooking grates 14. In the particular embodiment of a grill shown in FIG. 1, the lid 18 is a separate structure from the upper housing 16 and rotates on a hinge located within the upper housing. In other types of grills the lid and the upper housing may be integral and rotate relative to the lower portion of the grill via a hinge located near the back of the lower portion of the grill. In still other types of grills, the entire lid or upper shell may be lifted entirely off the grill. While the varied configurations of upper shells and lids of grills may themselves increase or decrease the likelihood and severity of flare-ups, the grate of the present invention functions to help prevent flare-ups in all types of grills.

The upper housing 16 of the grill may contain grill accessories, such as a steamer 22. The upper housing may also contain a rotisserie or other cooking elements well known in the art. Further accessories may include a retractable grill light 24 attached to the lower housing 12 to illuminate the cooking grates 14. The prevention of flare-ups by the present invention serves to protect these and other accessories as well.

Figure 3:
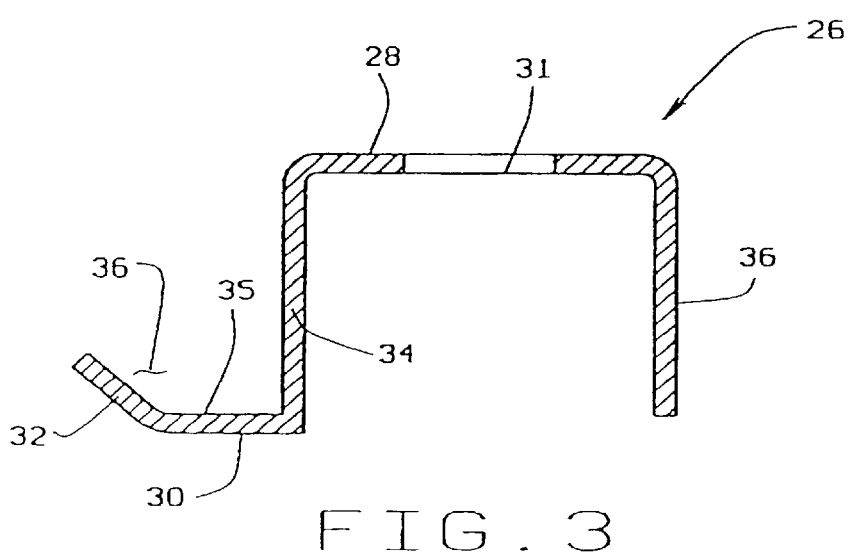
FIG. 3 is a cross sectional view of the grate member taken along the plane of line 3—3 in Fig.2.
Figures 2, 7:
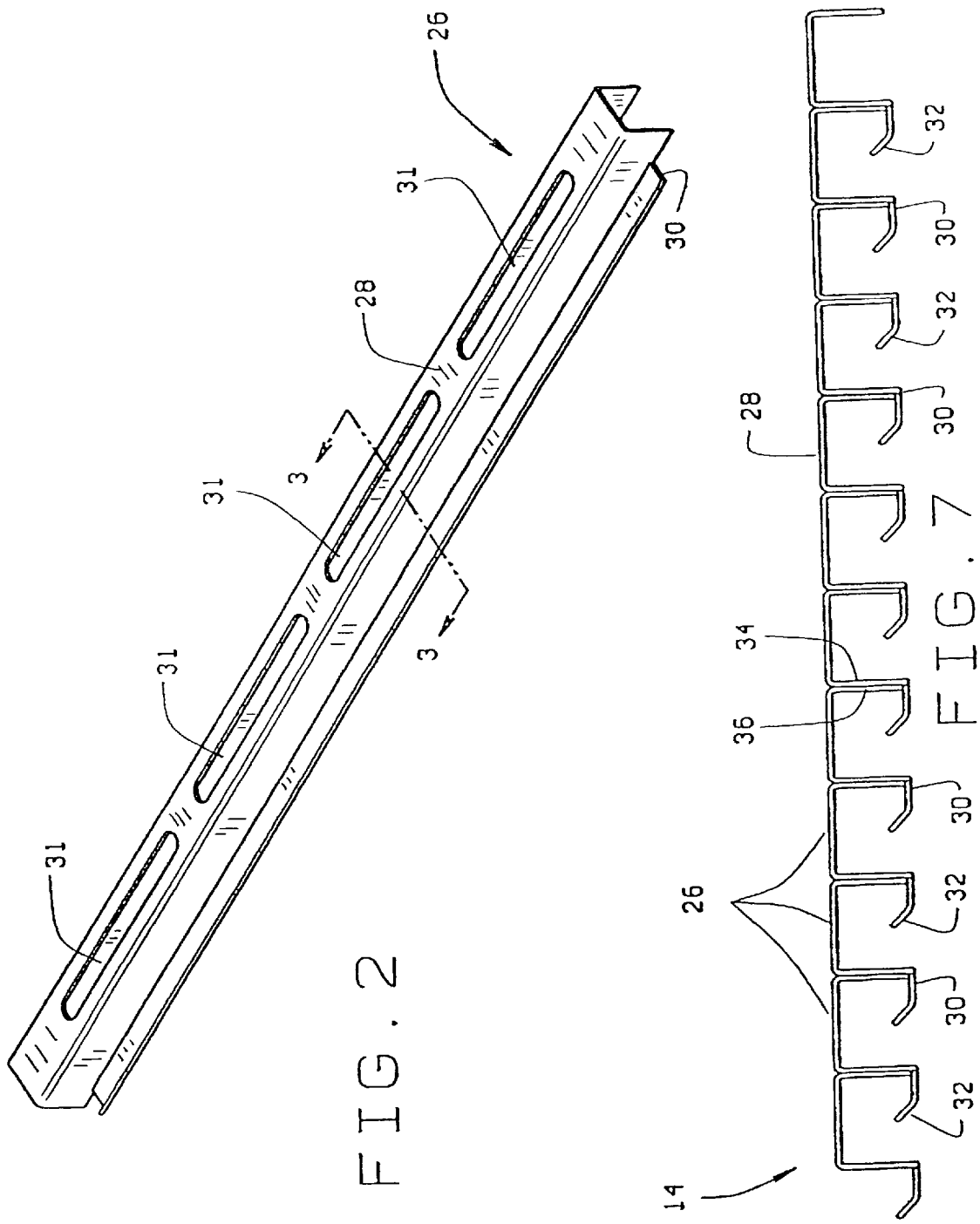
FIG. 2 is a perspective view of a grate member according to the present invention.
FIG. 7 is an end view of the grate of the present invention.

Referring now to FIGS. 2 and 3, a grate or rail member of the present invention is designated generally by the reference numeral 26. The grate member is elongated and preferably made of stainless steel, although the grate may have other shapes and be made from a variety of materials well known in the art to be suitable for use as in a cooking environment. Furthermore, the grate member is preferably of a onepiece construction, but it is recognized that multiple component pieces could be joined to form the grate members 26.

The grate member 26 has offset first and second parallel surfaces 28, 30 that form the reversible cooking surfaces of the grate when a plurality of grate members are assembled (see FIG. 7). The first surface 28 (or the "top" side) has a plurality of elongated holes or apertures 31 extending therethrough and approximately centered along the width of the first or top surface 28. While a plurality of apertures is preferred as shown and herein described, it is to be understood that any number of apertures, if properly dimensioned, could achieve the advantages of the present invention.

Adjacent the second surface 30 (or the "bottom" side) is a sloped or ramped portion 32. The first 28 and second 30 surfaces are substantially parallel and offset from one another, and are connected by a vertical rib 34. It may be seen in FIG. 3 that the configuration of the rib 34, the ramp 32, and the underside 35 of the second surface 30 form a gutter 36 that may collect a fluid. It is recognized that while the ramps 32 are shown as being linear, a large number of different shapes and gutter configurations could be used to practice the invention.

Figure 4:
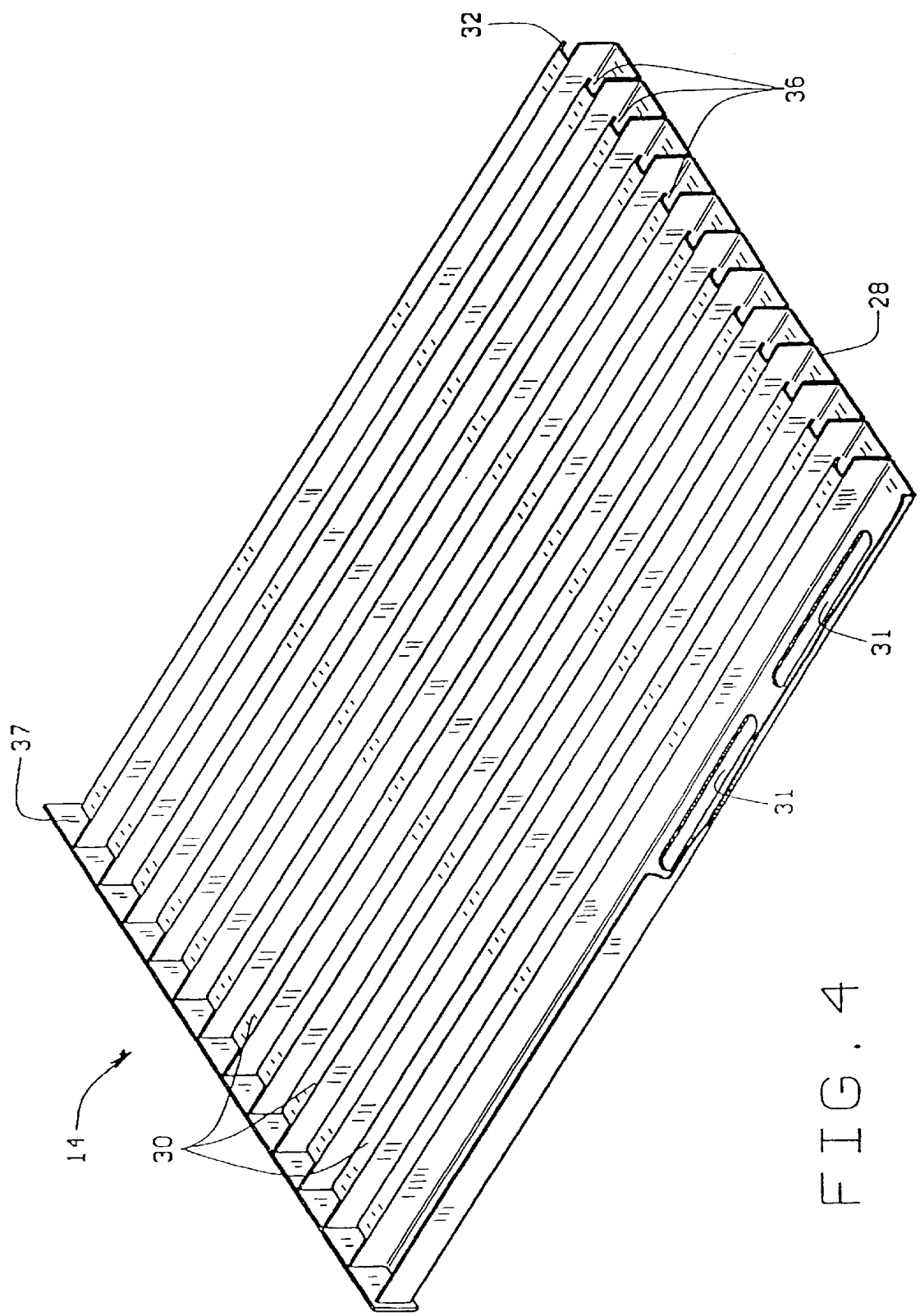
FIG. 4 is a perspective view of the grate of the present invention.
Figure 5:
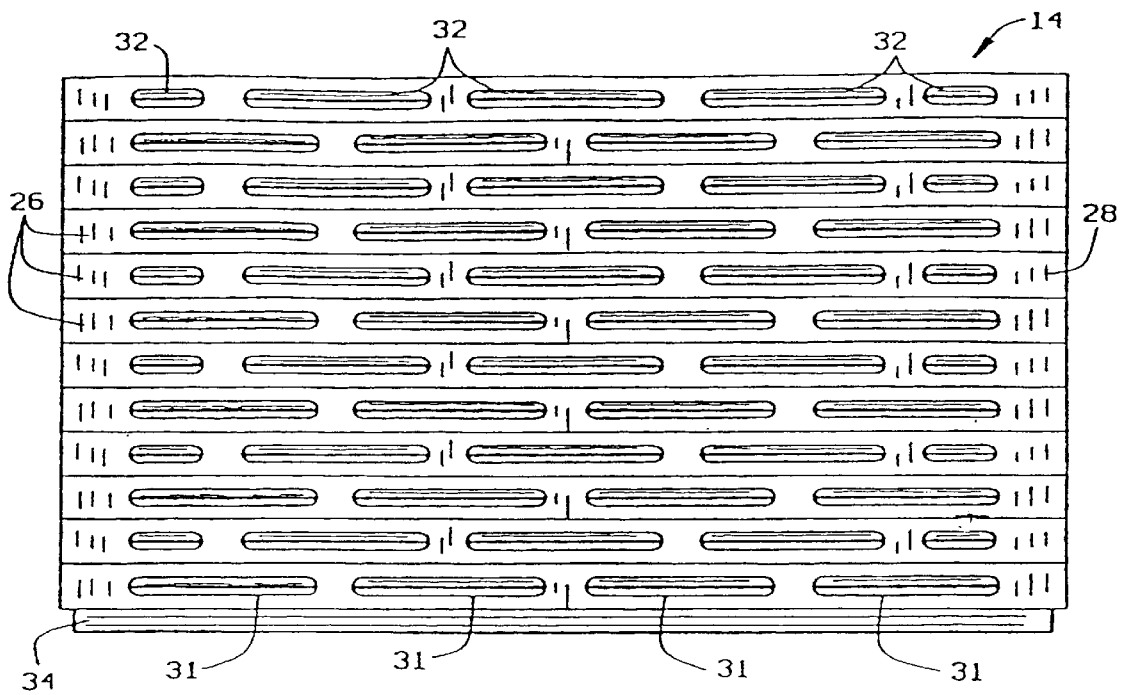
FIG. 5 is a top plan view of the grate of the present invention.
Figure 6:
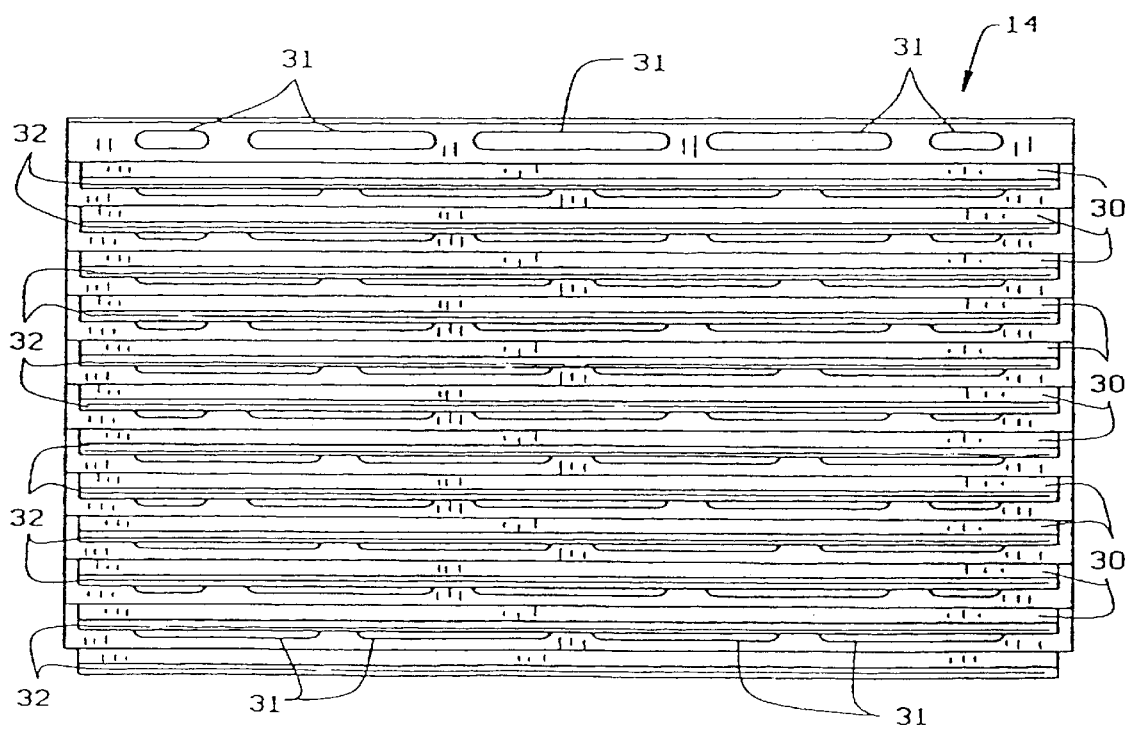
FIG. 6 is a bottom plan view of the grate of the present invention.

A plurality of substantially identical grate members 26 are connected to form the grate 14 of the present invention. As is best seen in FIGS. 4 and 7, the grate members 26 are placed back-to-back so that a vertical rib 34 of one grate member is immediately adjacent a vertical rib 36 of an adjacent grate member. Consequently, the first surface 28 of one grate member is positioned immediately over the second surface 30 of an adjacent grate member, the gutters 36 of adjacent members are generally parallel with one another, and the apertures 31 of a grate member are substantially coplanar with the apertures of an adjacent grate member. The relative dimensions of the ribs 34, 36 allow for a nesting fit between the members. The members may be more rigidly secured to one another by means well known in the art, such as, for example, welded end plates or and caps 37 as shown in FIG. 4. Furthermore, the grate members may be detachably connected so the grate may be taken apart to facilitate cleaning or repair.

As is evident from FIGS. 4 through 7, the first 28 and second 30 surfaces of the members form corresponding top and bottom surfaces of the grate. The top surface is substantially continuous, as opposed to the bottom surface which comprises a plurality of parallel flattened cooking surfaces akin to conventional grill racks. The gutters extend approximately half the width of an adjacent member's top surface 28. Because the grate members 26 are substantially identical, apertures 31 are substantially bisected by the edge of the gutter underneath. In other words, supposing a continuous stream of fluid passing through the entire volume of the aperture, about 50% of the fluid would be diverted by the gutter 36, while the remaining amount of the fluid would pass freely by the gutter and onto the heat source.

The invention operates as follows. When the grill plate is inserted into the grill "top" side up (FIG. 5), food is cooked on the flat top surface 28. Juices and cooking liquids entering the apertures 31 will be partially collected in the gutters 36. Hence, the amount of liquid and juice falling into the heat source of the grill is reduced, and accordingly the likelihood of flare-ups is lessened. Juice and liquid passing through the apertures that is not collected by the gutters falls freely into the heat source of the grill, thereby generating the desired barbecue flavor of the food.

Preferably, the grate 14 is mounted at an angle relative to the grill so that the fluid collected by the gutters flows along the gutters where it may be cleanly collected away from the heat source and either discarded or reused. When multiple grates are used, the various grates could be sloped toward or away from each other to drain the fluid from the gutters at a single location or a multitude of locations, such as, perhaps, at either the front or back of the grill.

Because the grate members have an increased mass, the grate enhances cooking with indirect heat. Thus, food may be placed on the grate offset from the heat source and still be cooked or warmed via the heat conducted through the grate. This may be especially advantageous when cooking small pieces of food, such as shrimp or vegetables, or for thin pieces of meat that may otherwise burn easily if placed directly over the heat source.

When the grill plate 26 is inserted into the grill "bottom" side up (FIGS. 4 and 6), the grate functions as a traditional barbecue grill rack. The food is cooked on the bottom flat surface 30. Meat juices and liquids generated during cooking either flow down the gutters and fall through the apertures 31, or trickle down the ribs 28 of the grate members 26, and perhaps to the apertures 31. When a flare-up occurs, the opposite side cooking surface shields the food and helps to distribute the heat away from the hot spots to avoid burning the food. Thus, flare-ups are likely to be considerably more manageable, all other things being equal, than with a cooking grate of the prior art. The bottom side of the grate may be preferred when cooking large pieces of meat such as thick steaks.

While the present invention has been described by reference to a specific embodiment, it should be understood that modifications and variations as would be apparent to one of ordinary skill in the art are within the scope of the invention which is limited solely by the claims and their equivalents.

What is claimed is:

1. A cooking grate for a grill comprising an assemblage of a plurality of substantially similar elongate rail members, said rail members each having a first portion for forming a first cooking surface and a second portion for forming a second cooking surface, said rail members being arranged side to side in an abutting relationship, and a number of said rail members having at least one aperture and an integrally formed gutter positioned to underlie at least a portion of said apertures of an adjacent rail member as the cooking grate is oriented for use of the first cooking surface.

2. The cooking grate of claim 1 wherein said first cooking surface is substantially smooth.

3. The cooking grate of claim 2 wherein said gutters form the second cooking surface, said first and second cooking surfaces being formed on opposite sides of said cooking grate.

4. The cooking grate of claim 3 wherein said rail members nest with each other, and further comprising an end bracket secured to opposite sides of said grates for holding said rail members in place.

5. The cooking surface of claim 4 wherein a number of said gutters have a substantially flat surface, said plurality of flat surfaces forming said second cooking surface.

6. A cooking grate for a grill, said cooking grate having a first cooking surface which is substantially smooth with a plurality of apertures therein through which juices produced during cooking may flow, and a plurality of gutters positioned to underlie at least a portion of said apertures to catch at least a portion of said juices to divert them away from a heat source positioned below said grate, said grate being reversible, with said gutters forming a second cooking surface as said grate is reversed on said grill.

7. The cooking grate of claim 6 wherein said second cooking surface is comprised of a plurality of substantially parallel gutter surfaces, said gutter surfaces having a portion which is substantially flat.

8. The cooking grate of claim 6 wherein said gutters underlie a portion of each of said apertures.

9. The cooking grate of claim 8 wherein said gutters have a sloped side to help retain said cooking juices in said gutters as it flows therealong.

10. The cooking grate of claim 6 wherein said grate is formed by a plurality of elongate rail members assembled side to side in a abutting relationship.

11. The cooking grate of claim 10 wherein said rail members are arranged in a nesting relationship.

12. A cooking grate for a grill, said grate comprising a plurality of nesting elongate rail members, each of said rail members having a plurality of generally elongate apertures therein through which juices produced by cooking food may flow and an integrally formed gutter positioned to underlie a portion of each of said apertures to catch a portion of said cooking juices, said grate having two cooking surfaces comprised of a first surface formed by a substantially flat surface of each of said rail members which abut as said rail members are nested and a second surface formed by the plurality of gutters, said rail members being held in place by an end bracket at opposing sides of said grate.

\* \* \* \* \*